United States Patent
Wilson et al.

[11] Patent Number: 5,881,993
[45] Date of Patent: Mar. 16, 1999

[54] FLUSHOMETER PISTON

[75] Inventors: John R. Wilson, Naperville, Ill.; Daniel J. Carroll, Hammond, Ind.

[73] Assignee: Sloan Valve Company, Franklin Park, Ill.

[21] Appl. No.: 937,881

[22] Filed: Sep. 25, 1997

[51] Int. Cl.$^6$ ............................ F16K 31/143; F16K 47/02
[52] U.S. Cl. ................... 251/40; 138/45; 251/121
[58] Field of Search .......................... 251/40, 120, 121; 138/40, 45, 46

[56] References Cited

U.S. PATENT DOCUMENTS

| | | | |
|---|---|---|---|
| 1,756,263 | 4/1930 | Sloan | 251/40 |
| 1,830,005 | 11/1931 | Sloan | 251/40 |
| 2,007,652 | 7/1935 | Kocour | 251/40 |
| 2,082,226 | 6/1937 | Stafford | 251/40 |
| 2,136,221 | 11/1938 | Sloan | 251/40 |
| 2,369,104 | 2/1945 | Fredrickson | 251/40 |
| 2,406,259 | 8/1946 | Russell et al. | 251/40 |
| 2,472,576 | 6/1949 | Dobrick | 251/40 |
| 3,207,467 | 9/1965 | Buhler | 251/40 |
| 3,279,742 | 10/1966 | Billeter | 251/40 |
| 4,261,545 | 4/1981 | Allen | 251/40 |
| 5,415,374 | 5/1995 | Carroll et al. | 251/40 |

*Primary Examiner*—George L. Walton
*Attorney, Agent, or Firm*—Dorn, McEachran, Jambor & Keating

[57] ABSTRACT

A flush valve includes a body with an inlet, an outlet, a valve seat at the outlet, and a piston movable in the body toward and away from the valve seat to control flow through the outlet. The piston has a chamber and there is a refill orifice in the piston connecting the chamber with the body inlet. Pressure in the chamber maintains the piston closed upon the valve seat. A relief valve in the piston vents the chamber to the outlet to permit the piston to move away from the valve seat to open flow from the inlet to the body outlet. The piston has a guide portion which extends downstream of the valve seat when the piston is in the closed position. The guide portion of the piston has a plurality of outwardly extending axial ribs, the outer surface of which is radially in alignment with the path of flow through said valve seat. The piston area between the ribs is closed by a skirt to confine the path of flow exteriorly of the piston portion to provide a defined flow path through the valve seat from the inlet to the outlet.

3 Claims, 1 Drawing Sheet

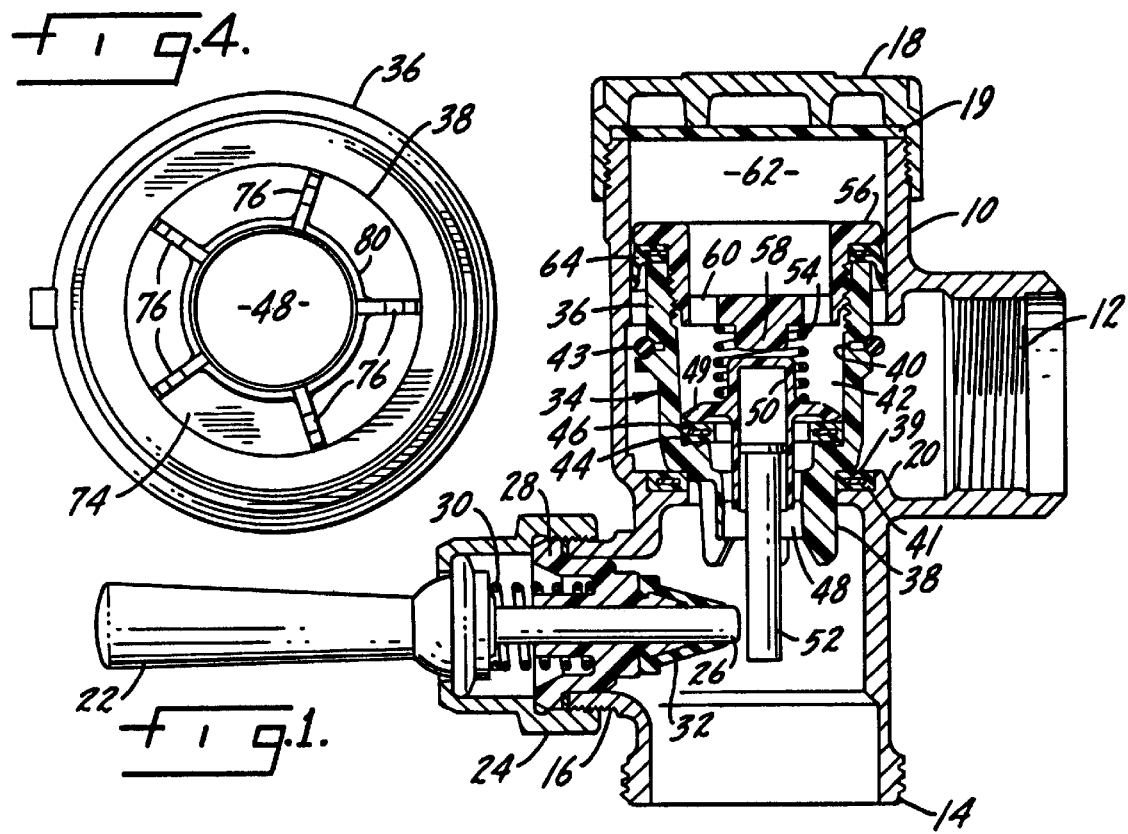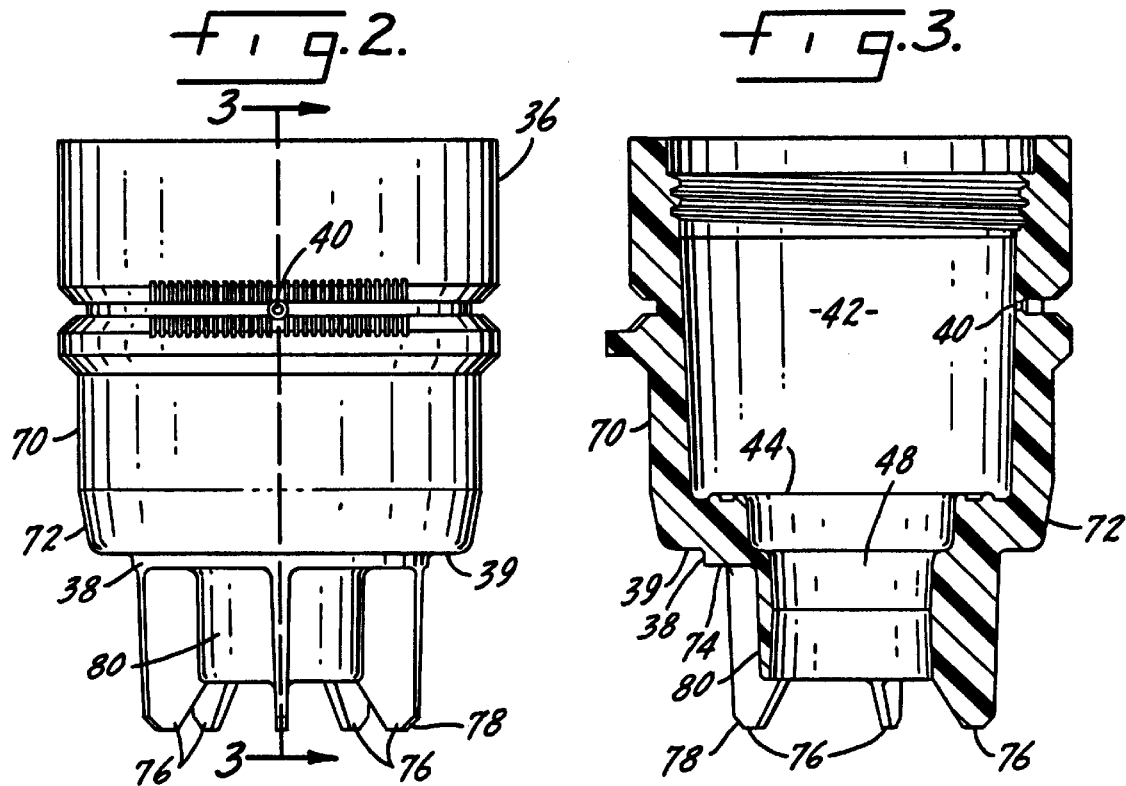

FLUSHOMETER PISTON

THE FIELD OF THE INVENTION

The present invention relates to flush valves or flushometers, as they are currently designated, which are used to discharge a desired amount of water through a urinal or water closet. Various governmental agencies have set standards as to the permitted volume of water which can be used in a single flush of a toilet device. The present invention is specifically designed to provide a volume of water per flush of 1.6 gallons, which is approximately six liters, the designated volume of flush water in areas using the metric system. It is also desirable that the water pass through the flush valve as rapidly as possible. Accordingly, the present invention is specifically directed to a design for the flush valve piston which enables the flushometer to pass the desired quantity of water at a high rate of flow and at a low dynamic water pressure. Specifically, it is desired that the flush valve pass 1.6 gallons per flush at a dynamic water pressure in the 8–10 psig range at approximately 23 gallons per minute.

The present invention is particularly directed to various modifications of the piston in a flush valve of the type sold by Sloan Valve Company, the assignee of the present application, under the registered trademark "GEM." The piston for the GEM-brand flush valve has been designed so as to provide the above-designated parameters -and to reduce any potential back pressure which would retard the closing of either the relief valve or the piston.

SUMMARY OF THE INVENTION

The present invention relates to flush valves or flushometers for passing a desired quantity of water to a urinal or water closet and specifically to a design of the flush valve piston to improve control of water flow through the flush valve.

A primary purpose of the present invention is a flush valve piston design which removes any impediments or restrictions in the flow path and opens the flow path for a clear flow of water through the flush valve outlet.

Another purpose of the invention is a flush valve piston having a plurality of circumferentially disposed guide ribs which stabilize the piston in moving between open and closed positions.

Another purpose of the invention is a flush valve piston as described, in which the area between the guide ribs is closed by a skirt to control flow and to provide for more consistent passage of water through the flush valve outlet.

Another purpose is a flush valve piston as described, in which the piston ribs and related skirt are so formed as to reduce back pressure upon the relief valve and upon the piston.

Another purpose is a flush valve piston having a throttling ring directly adjacent the seat portion of the piston, which throttling ring slows flow just prior to full shutoff to reduce water hammer caused by closure of the piston upon its valve seat.

Other purposes will appear in the ensuing specification, drawings and claims.

BRIEF DESCRIPTION OF THE DRAWINGS

The invention is illustrated diagrammatically in the following drawings wherein:

FIG. 1 is a vertical section through a flushometer illustrating the piston design of the present invention;

FIG. 2 is an enlarged side view of the piston;

FIG. 3 is a section along plane 3—3 of FIG. 2; and

FIG. 4 is a bottom view of the piston of FIGS. 2 and 3.

DESCRIPTION OF THE PREFERRED EMBODIMENT

The flush valve of the present invention is conventionally used with urinals or with water closets. The flush valve piston is designed to control the flow of water through the flush valve to provide a specific quantity of water for each flushing operation, with the water passing through the flush valve at high flow rate even when the water pressure is on the low side of the range of water pressures commonly found in the United States. Although the invention will be described in which the desired volume per flush is 1.6 gallons or six liters, it should be understood that the size of the various parts may be modified to provide different volumes of water per flush.

The flush valve as shown has a generally hollow valve body 10 which includes an inlet connection 12, an outlet connection 14, and a handle coupling connection 16. The top of the valve body is closed by a cover 18 and there may be a seal element 19 between the cover and the body. A main valve seat 20 is formed on the interior walls of the body 10. The valve is actuated by an operating handle 22 which is fastened to the valve body 10 by means of a coupling nut 24. The handle is connected to a plunger 26 which extends to the interior portion of the valve body. The plunger 26 is guided and supported by a bushing 28 and is restored by a spring 30. A rubber sealing cap or packing 32 is snapped on the end of bushing 28 and prevents leakage outwardly from the handle opening. The valve as shown has a manual handle 22 for operation. The valve is equally adaptable to automatic operation, for example by a solenoid.

A piston assembly indicated generally at 34 is adapted to reciprocate within the body 10. The assembly 34 includes a hollow, generally cylindrical piston 36. The piston 36 has a lower cylindrical extension 38 which is directly adjacent a piston seat area 39, with the seat area 39 being normally seated upon a seal member 41 to close the main valve seat 20 and to thereby control the flow of water through the flush valve. The piston 36 has a bypass orifice 40 controlled by a filter ring 43, as described in U.S. Pat. No. 4,261,545. The bypass orifice connects the inlet side of the flush valve with the interior chamber 42 of the piston. The bypass has a small diameter which may range in size from 0.020" to as much as 0.0245," with the size of the diameter controlling the rate at which chamber 42 fills to cause closure of the flush valve.

The interior chamber 42 of the piston 36 has an annular ledge 44 supporting a seal 46. The ledge and seal are at the top of a central passage 48 which connects chamber 42 with the outlet side of the flush valve.

The piston assembly 34 also includes a relief valve 50 which normally closes passage 48 of the piston 36. The relief valve has a collar 49 which engages the seal 46 on the annular ledge of the piston. An operating stem 52 is slidable in the central hollow portion of the relief valve 50 and extends to a point adjacent plunger 26. A spring 54 assists in holding the relief valve 50 in its position to close and seal chamber 42.The The piston assembly 34 further includes an insert 56 threadedly engaging the upper wall of piston 36. The insert 56 has a central stop 58 against which the spring 54 abuts. The stop has holes 60 which provide fluid communication between the piston interior chamber 42 and an upper pressure chamber 62. A packing member or seal member 64 held between the insert 56 and piston 36 provides a slidable seal separating the pressure chamber 62 from inlet water pressure.

The piston 36 has a cylindrical wall 70 which is smooth and unobstructed, contrary to prior piston designs for similar flush valves. Directly adjacent the cylindrical wall 70 is a tapered piston area 72 which may have a taper of on the order of about ten degrees, which taper is effective to provide a clear flow path about the piston when it is in the raised position away from the valve seat 20. Directly adjacent the beveled area 72 is the piston seat area 39 which will close upon the seat 20 when the valve is in the closed position. Directly downstream of the piston seat area 39 is a ring 74 which has an outer diameter slightly less than the diameter of the valve outlet adjacent the seat 20 so that ring area 74 will be inside of the valve seat when the piston is closed. The ring 74 functions as a throttling means in that it substantially reduces flow through the valve outlet just prior to complete valve closure.

Directly adjacent the throttling ring 74 is piston portion 38 which has a plurality of radially and axially extending ribs 76. The outer diameter of the ribs is less than wall 70 and just slightly less than the passage through seat 20. The ribs are thus inside of the major portion of the piston so as not to restrict flow. The number of ribs is important. There must be sufficient ribs so that there is stability and guidance for the-piston as it moves toward and away from the valve seat. However, the number of ribs must not be so great as to create any reduction or obstruction to water flow past the piston when the piston is in the valve open position. Five has been determined to be a satisfactory number of ribs and there should not be less than four nor should there be more than six. At the lower end of each of the axially extending ribs there is a chamfered area 78 which assists in assembling the piston within the flush valve assembly.

The area between each of the circumferentially, generally uniformly spaced ribs 76 is closed by a skirt 80. As shown, the skirt 80 has a radius slightly less than the exterior surface of the ribs 76. However, what is important is that the skirt close the area between ribs to provide control of water flow past the piston, which in turn will provide a more consistent operation of the flush valve. The skirt improves the flow path by maintaining it in an axial direction generally circumferentially about the piston portion 38. By preventing water flow into the water passage 48, the skirt also prevents any back pressure which might retard closure of the relief valve.

The skirt areas 80 terminate short of the downstream end of each of the ribs 76. This is important, as it prevents back pressure from being created downstream of the piston, which would in turn retard the closure of the piston. The longer the piston is held in an open position, the greater the water flow through the flush valve. Termination of the skirt short of the axial downstream end of the ribs reduces back pressure which might retard closure of the piston and the presence of the skirt reduces back pressure which would retard the closure of the relief valve.

Of importance in the invention is the specific design of that-portion of the piston which controls the flow of water when the piston is in the open position. The major cylindrical portion of the piston, indicated at 70, has no obstructions as in prior art flush valves. Thus, there is no-impediment to water flow. The tapered area 72 increases size of the flow path in that it allows a greater flow of water than would be the case if the major piston diameter was continuous. The ribs provide stability for the piston as it moves between open and closed positions and the skirt closure areas between the ribs further define the flow path about the exterior of the position and provide more consistent valve operation. The existence of the skirt and the fact that it has an axial length less than that of the ribs reduces the pressure drop across the piston. The skirt also prevents back pressure from slowing closure of the relief valve and from slowing closure of the piston. The snubbing ring 74 provides a throttling effect just prior to piston closure, thus resisting water hammer.

Whereas the preferred form of the invention has been shown and described herein, it should be realized that there may be many modifications, substitutions and alterations thereto.

The embodiments of the invention in which an exclusive property or privilege is claimed are defined as follows:

1. A flush valve including a body having an inlet and an outlet, a valve seat at said outlet, a piston movable in said body toward and away from said valve seat to control flow from said inlet through said outlet, said piston including a chamber, a refill orifice in said piston connecting said chamber with said body inlet, pressure in said chamber maintaining said piston closed upon said valve seat, a relief valve in said piston for venting said chamber to said outlet, means for opening said relief valve to vent said chamber causing said piston to move away from said valve seat to open flow through said outlet, said piston having a guide portion which extends downstream of said valve seat, said guide portion having a plurality of outwardly extending axial ribs, the outer surface of which is radially in alignment with the path of flow through said valve seat, the piston area between said ribs being closed by a skirt to confine the path of flow exteriorly of said guide portion to provide a defined flow path through said valve seat from said inlet to said outlet, said skirt reducing back pressure on said relief valve and terminating short of said axial rib termination to reduce pressure drop across the piston to increase flow rate, said piston having a seat portion formed and adapted to close upon said valve seat, said piston having an inwardly beveled outer surface directly adjacent and upstream of said seat portion, with said inwardly beveled surface increasing water flow past said piston when it is away from said valve seat, a throttling ring on said piston directly downstream of said seat portion and directly upstream from said axial ribs, said ring throttling flow through said outlet just prior to closure of said piston upon said valve seat.

2. The flush valve of claim 1 characterized in that said ribs are generally circumferentially equally spaced and are at least four in number.

3. The flush valve of claim 1 characterized in that said piston has a seat portion formed and adapted to close upon said valve seat, said piston having an inwardly beveled outer surface upstream of said seat portion, with said inwardly beveled surface increasing water flow past said piston when it is away from said valve seat.

* * * * *